(12) United States Patent
Beekmann et al.

(10) Patent No.: US 11,870,265 B2
(45) Date of Patent: Jan. 9, 2024

(54) WIND TURBINE FOR FEEDING ELECTRICAL POWER INTO AN ELECTRICAL SUPPLY NETWORK

(71) Applicant: Wobben Properties GmbH, Aurich (DE)

(72) Inventors: Alfred Beekmann, Wiesmoor (DE); Ingo MacKensen, Aurich (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 349 days.

(21) Appl. No.: 17/422,599

(22) PCT Filed: Jan. 15, 2020

(86) PCT No.: PCT/EP2020/050865
§ 371 (c)(1),
(2) Date: Jul. 13, 2021

(87) PCT Pub. No.: WO2020/148313
PCT Pub. Date: Jul. 23, 2020

(65) Prior Publication Data
US 2022/0094167 A1    Mar. 24, 2022

(30) Foreign Application Priority Data
Jan. 16, 2019 (DE) ............. 10 2019 101 048.9

(51) Int. Cl.
*H02J 3/38* (2006.01)
*H02J 3/00* (2006.01)
(Continued)

(52) U.S. Cl.
CPC ............ *H02J 3/381* (2013.01); *F03D 7/0284* (2013.01); *H02J 3/001* (2020.01); *H02J 3/48* (2013.01); *H02J 2300/28* (2020.01)

(58) Field of Classification Search
CPC .... H02J 3/381; H02J 3/001; H02J 3/48; H02J 2300/28; F03D 7/0284
(Continued)

(56) References Cited

U.S. PATENT DOCUMENTS 7,525,208 B2    4/2009 Wobben
10,389,262 B2   8/2019 Jakob et al.
(Continued)

FOREIGN PATENT DOCUMENTS

DE    102017106436 A1    9/2018
EP        1831987 B1      7/2017
(Continued)

OTHER PUBLICATIONS

Ren et al., "Grid Fault Ride Through of a Medium-Voltage Three-Level Full Power Wind Power Converter," *2016 IEEE 8th International Power Electronics and Motion Control Conference (IPEMC-ECCE Asia)*, Hefei, China, May 22-26, 2016. (6 pages).

*Primary Examiner* — Alfonso Perez Borroto
(74) *Attorney, Agent, or Firm* — Seed IP Law Group LLP (57) ABSTRACT

Provided is a method for feeding electrical power into an electrical supply network having a network voltage using a wind turbine having an inverter, which has a DC voltage intermediate circuit having an intermediate circuit voltage and a chopper circuit connected to the intermediate circuit for discharging electrical energy from the intermediate circuit. The method includes feeding electrical power into the network in a normal operation if no network fault has been detected, detecting a fault if the network voltage falls below an undervoltage value, interrupting or reducing the feed if the fault has been detected, and ending the interruption or reduction if the end of a network fault is detected. During the fault and/or from the end of the fault, the fed-in power is limited to a limit, and, to limit the power, the intermediate (Continued)

circuit voltage is limited using the chopper circuit depending upon the limit.

19 Claims, 4 Drawing Sheets

(51) Int. Cl.
*F03D 7/02* (2006.01)
*H02J 3/48* (2006.01)

(58) Field of Classification Search
USPC .......................................................... 307/84
See application file for complete search history.

(56) References Cited

U.S. PATENT DOCUMENTS

| | | | |
|---|---|---|---|
| 10,903,648 B2 | 1/2021 | Brombach et al. | |
| 2009/0206606 A1 | 8/2009 | Jorgensen et al. | |
| 2013/0334818 A1* | 12/2013 | Mashal | F03D 7/0264 290/44 |
| 2014/0361624 A1* | 12/2014 | Ault | H02J 9/062 307/65 |
| 2015/0108761 A1* | 4/2015 | Bala | H02P 9/42 290/54 |
| 2016/0094170 A1* | 3/2016 | Sanz Ceballos | H02P 9/007 322/61 |

FOREIGN PATENT DOCUMENTS

| | | | |
|---|---|---|---|
| EP | 3206286 A1 | 8/2017 | |
| EP | 3004637 B1 | 3/2018 | |
| WO | 2016050621 A1 | 4/2016 | |

\* cited by examiner

WIND TURBINE FOR FEEDING ELECTRICAL POWER INTO AN ELECTRICAL SUPPLY NETWORK

BACKGROUND

Technical Field

The present invention relates to a method for feeding electrical power into an electrical supply network having a network voltage by means of a wind turbine. The present invention likewise relates to a corresponding wind turbine. The invention also relates to a corresponding wind farm.

Description of the Related Art

Wind turbines are known and are usually used to feed electrical power into an electrical supply network. In the meantime, it has been identified that wind turbines are also highly suitable for supporting the electrical supply network. This also includes the fact that wind turbines can react to network faults in a tolerant manner. In particular, in the event of a network fault, they can adapt the feeding-in of electrical power to specifications from a network operator of the electrical supply network. In particular, in the event of a network fault in which there is a dip in the network voltage, they can reduce or interrupt the electrical power depending on the specification and can continue to feed in power after the end of the network fault.

Such network faults in which there is a brief dip in the network voltage are usually of a very short duration and generally last for less than 1 second. In addition to passing through such a network fault, the behavior at the end and shortly after the end of the network fault is also important, in particular. At that moment, the electrical supply network is in a transition phase which is not very stable. If electrical power is fed in in an uncontrolled, unfavorable and/or incorrect manner in this transition phase by many producers which feed power into the same electrical supply network, this can easily result in a new network fault and possibly even in a more serious fault than the fault which has just been overcome.

A method for managing such a network fault is described, for example, in the U.S. Pat. No. 7,525,208 B2. Said document proposes, in particular, controlling the feeding-in of the power in such a manner that a higher power is fed in immediately after the network fault than immediately before the network fault.

However, it has now been identified that there may also be situations and/or conditions in which it is expedient for the power which is fed in immediately after the network fault to not be higher than the power which is fed in immediately before the network fault. Nevertheless, the power should be fed in again as quickly as possible after the network fault or the feeding-in should be increased again as quickly as possible, but the feeding-in of a higher power than before the network fault should nevertheless be avoided if possible.

In the priority application for the present application, the German Patent and Trademark Office searched the following prior art: EP 3 004 637 B1, EP 1 831 987 B1, US 2009/0206606 A1 and DE 10 2017 106 436 A1.

BRIEF SUMMARY

Provided herein are techniques for managing a network fault, in which there is a brief dip in the network voltage, by means of a wind turbine, to be precise in such a manner that the power which is fed in is increased again immediately after the network fault, but without exceeding the value of the power which was fed in and was up-to-date immediately before the network fault. The intention is to at least propose an alternative solution to previously known solutions.

A method is provided. The method relates to the practice of feeding electrical power into an electrical supply network. The power is fed in by means of a wind turbine and the latter has, in particular, a so-called full converter concept in which electrical power is produced by a generator of the wind turbine, is rectified and is fed into the electrical supply network by an inverter. In this case, the electrical supply network is characterized by a network voltage, that is to say the voltage which the electrical supply network has.

In order to feed in the electrical power, the wind turbine therefore has an inverter which in turn has a DC voltage intermediate circuit. In this respect, the inverter is also representative of a plurality of inverters or of an inverter device having a plurality of inverters. The DC voltage intermediate circuit has an intermediate circuit voltage which can vary in terms of its voltage level. For example, it can vary in the range from 550 V to 700 V. However, other values also come into consideration. These other values may be similar or they may be significantly higher if an accordingly higher voltage is intended to be output by means of the inverter. In the case of a plurality of inverters, a plurality of DC voltage intermediate circuits can also be accordingly provided, or a common DC voltage intermediate circuit can be used by a plurality of inverters.

A chopper circuit is also connected to the DC voltage intermediate circuit in order to discharge electrical energy from the DC voltage intermediate circuit. The inverter naturally discharges energy from the DC voltage intermediate circuit when feeding in electrical power. In addition, however, such a chopper circuit can additionally or exclusively discharge energy from the DC voltage intermediate circuit when necessary. This is carried out such that this discharging of electrical energy is controlled using a pulse pattern. The result is then substantially a pulsed current which is guided through a resistor or a resistor bank in order to be converted into heat there.

The proposed feeding-in of electrical power is carried out using such a wind turbine having a described inverter which has a DC voltage intermediate circuit with a chopper circuit.

In this case, electrical power is fed into the electrical supply network by means of the inverter in a normal mode if no network fault of the electrical supply network has been detected. In this case, the wind turbine can operate particularly preferably in a so-called network parallel mode in which all power produced is fed into the electrical supply network. In this case, a normal mode is understood as meaning a mode in which no network fault has been detected. However, it may also mean that the described network parallel mode is left and the power which is fed in is reduced, for example, on account of a frequency increase detected in the electrical supply network, to name one example. In this respect, a normal mode is understood here as meaning a mode in which a fault, during which the network voltage falls significantly, does not occur.

A network fault is therefore detected, that is to say a network fault is assumed, if the network voltage falls below a predefined undervoltage value. Such an undervoltage value may be, in particular, 80% or below 80% of the nominal network voltage. This therefore means that the network voltage falls significantly. The network voltage may also fall to 10% of the nominal network voltage, for example. Slight voltage fluctuations, for example in the range of a few percent, for example 1 to 3%, do not yet result in a network fault being detected.

If such a network fault has now been detected, the feeding-in of electrical power into the electrical supply network is reduced or is even entirely interrupted. However, even if the feeding of electrical power into the electrical supply network is interrupted, the wind turbine or its inverter preferably nevertheless remains connected to the electrical supply network, in particular without a network isolating switch being opened or without the wind turbine even being shut down and switched off. In particular, control remains active and the wind turbine is kept ready if possible to be able to resume the normal mode as quickly as possible after the end of the network fault. However, resuming the normal mode as quickly as possible can also mean that the power is not suddenly increased to the value of the normal mode after the end of the network fault, but rather a short rising edge is provided, for example, in order to bring the amplitude of the power fed in to the desired final value somewhat more slowly than by means of a jump.

In any case, the interruption or reduction in the feeding-in or the reduced feeding-in is terminated when the end of a network fault has been detected. The end of a network fault is detected, in particular, when the network voltage has reached a normal value again, in particular when it has reached the nominal network voltage again. In this case, slight fluctuations, such as the exemplary 1 to 3% already described above, can be tolerable. The end of a network fault is therefore also detected when such slight fluctuations are present.

In this case, it is proposed that the power fed in is limited to a limit power during the network fault and/or after the end of the network fault. In particular, this achieves the situation in which the electrical power fed in does not exceed this limit power during the network fault and/or shortly afterward. In this case, the limit power can also be predefined as a temporal profile.

It is now also proposed that, in order to limit the power fed in to the limit power during the network fault and/or after the end of the network fault, the intermediate circuit voltage is limited on the basis of the limit power by means of the chopper circuit.

The level of the intermediate circuit voltage depends, in particular, on how much power is fed into this intermediate circuit voltage by the generator of the wind turbine and how much power is fed from this DC voltage intermediate circuit into the electrical supply network by the inverter, wherein this value may also be negative since an inverter could thus also consume power from the network, but this is not important here. In simple terms, the intermediate circuit voltage increases if more power is input to the DC voltage intermediate circuit than is removed and vice versa. This power balance can now be influenced by the chopper circuit, which is proposed here. In this case, it is proposed here to deliberately control the intermediate circuit voltage in the event of a network fault, that is to say during the network fault and/or shortly afterward, via this chopper circuit. The power which is fed into the electrical supply network from the DC voltage intermediate circuit by the inverter can therefore also be influenced.

In this case, it has been identified, in particular, that, in the case of a brief network fault where there is a dip in the network voltage, very fast power changes of the power fed in must be carried out in order to avoid uncontrolled or poorly controlled feeding of electrical power into the supply network in such a critical state.

It is proposed, in particular, that the inverter feeds electrical power into the electrical supply network on the basis of the intermediate circuit voltage, that is to say on the basis of the level of the intermediate circuit voltage, into the electrical supply network.

According to one embodiment, it is proposed that the power fed in is limited to the limit power after the end of the network fault for a predetermined recovery period. This recovery period is provided so that the electrical supply network has time to recover from the network fault in order to return to a stable operating point. The predetermined recovery period is in the range from 10 ms to 10 seconds, preferably in the range from 50 ms to 2 seconds. The recovery period is therefore at least 10 ms, specifically after the end of the network fault. The power fed in is limited to the limit power in this time. In this case, the limit power may also be a changeable variable, in particular a rising edge, within this recovery period.

It is also proposed that the power fed in in this recovery period is not higher than immediately before the detection of the network fault. The proposed method therefore prevents the power fed in from being increased after the end of the network fault above the value immediately before the network fault, thus avoiding a corresponding excessive power increase. This is achieved, in particular, by means of the proposed limitation of the intermediate circuit voltage by means of the chopper circuit. The limit power is preferably predefined as a time-dependent power profile, in particular with a rising edge, in order to return the power fed in after the end of the fault to a value of the power fed in immediately before the network fault. The power fed in can therefore be managed, in particular after the end of the network fault, and excessive power increases, in particular, can be avoided. Moreover, it should also be noted that a network fault in which there is a dip in the network voltage is usually so short that the electrical power which can be produced from wind on the basis of the prevailing wind conditions does not change by a relevant level. In other words, an available power of an approximately constant level can be assumed. The power fed in can therefore also be returned again to its value immediately before the network fault by predefining the limit power.

In this case, it has been identified, in particular, that the limit of the intermediate circuit voltage can also be influenced by predefining the limit power by virtue of the fact that the intermediate circuit voltage is limited on the basis of the limit power. It is proposed, in particular, that the limit of the intermediate circuit voltage qualitatively follows the limit power. In particular, it is proposed that, for a rising edge of the limit power, a rising edge of a limit of the intermediate circuit voltage is also set.

According to one embodiment, it is proposed that, in order to limit the intermediate circuit voltage during the network fault and/or after the end of the network fault, at least one cut-off voltage is predefined on the basis of the network fault and/or on the basis of the limit power and the chopper circuit discharges electrical energy from the DC voltage intermediate circuit depending on whether the intermediate circuit voltage reaches or exceeds the cut-off voltage. The chopper circuit can therefore be controlled by specifying such a cut-off voltage. The intermediate circuit voltage is captured and is compared with the cut-off voltage and the chopper circuit is controlled on the basis thereof. In this respect, the chopper circuit regulates the intermediate circuit voltage, for which the cut-off voltage can be considered to be a desired value. In this case, it can also be provided that, the more energy is discharged per unit time, that is to say the higher the power discharged from the DC voltage intermediate circuit, the more greatly the cut-off voltage is exceeded by the intermediate circuit voltage.

In order to limit the intermediate circuit voltage, a lower cut-off voltage and an upper cut-off voltage are preferably predefined on the basis of the network fault and/or on the basis of the limit power. The cut-off voltage described above, on the basis of which the chopper circuit can be controlled, can correspond here to the lower cut-off voltage.

It is also predefined that the upper cut-off voltage is greater than the lower cut-off voltage by a variable band gap. The lower and upper cut-off voltages therefore form a cut-off voltage band.

It is also proposed that power is discharged from the DC voltage intermediate circuit by means of the chopper circuit as soon as the intermediate circuit voltage reaches the lower cut-off voltage. It is additionally proposed that, the more power is discharged from the DC voltage intermediate circuit by means of the chopper circuit, the closer the intermediate circuit voltage comes to the upper cut-off voltage. By discharging power, energy is naturally also discharged from the DC voltage intermediate circuit. However, the consideration of the discharged power, that is to say the energy discharged per unit time, is more expedient here in order to explain that more power, that is to say more energy per unit time, is discharged by means of the chopper circuit, the closer the intermediate circuit voltage comes to the upper cut-off voltage, that is to say the higher the intermediate circuit voltage is.

It is also proposed that the band gap has a prefault gap before the network fault, that is to say in the normal mode. Such a prefault gap can be considered to be comparatively large and may have, for example, a magnitude of 2% to 5% of the intermediate circuit voltage, in particular may have a nominal intermediate circuit voltage which may be 700 V, for example.

It is also proposed that, if the network fault is detected, the band gap is reduced in order to discharge as much power as possible from the DC voltage intermediate circuit by means of the chopper circuit in order to hold the intermediate circuit voltage as soon as the intermediate circuit voltage has reached the lower cut-off voltage. In particular, this is based on the concept that, in the normal mode, the chopper circuit begins to discharge power from the DC voltage intermediate circuit if the intermediate circuit voltage reaches the lower limit value of the chopper threshold, namely the lower cut-off voltage. At that moment, however, only very little power is discharged by the chopper circuit. This is then increased, the closer the intermediate circuit voltage comes to the upper cut-off voltage. If the intermediate circuit voltage reaches the upper cut-off voltage, the chopper circuit then discharges maximum power from the DC voltage intermediate circuit, that is to say as much power as possible using the chopper circuit, including a connected resistor bank or resistor banks and on the basis of the intermediate circuit voltage. The level of the discharged power is therefore controlled depending on where the intermediate circuit voltage is situated in the cut-off voltage band.

On the basis of this, the reduction of the band gap, in particular if it is reduced to a very low value, results in the intermediate circuit voltage also simultaneously almost reaching the upper cut-off voltage when the lower cut-off voltage is reached and the chopper circuit therefore discharging maximum power from the DC voltage intermediate circuit. Precisely this effect is therefore achieved by reducing the band gap, in particular by reducing it to a value close to zero. This means that, during the network fault, the intermediate circuit voltage does not exceed the lower or upper cut-off voltage, but does not fall below it either. The intermediate circuit voltage is therefore controlled and held at the level of the lower or upper cut-off voltage. The power fed in can therefore also be controlled and held well.

Additionally or alternatively, it is proposed that the band gap is increased after the end of the network fault in order to reduce power discharged from the DC voltage intermediate circuit by means of the chopper circuit. In particular, the band gap is increased from a value of zero and/or is increased continuously and therefore less and less power is discharged from the DC voltage intermediate circuit by means of the chopper circuit. This is proposed for the time after the end of the network fault if the network fault has been eliminated and the electrical supply network is in the process of settling down or changing to a normal operating point which is as stable as possible again.

In this case, the power fed in will also increase again, with the result that more and more power is fed into the electrical supply network by the inverter and less and less power is discharged by the chopper circuit. As a result, it is also possible to achieve the situation in which the intermediate circuit voltage is reduced again if it was increased with the occurrence of the network fault. It can then be specifically reduced again to its old value before the network fault. As soon as this is achieved, the wind turbine or its inverter feeds power into the electrical supply network substantially in a normal mode again.

Additionally or alternatively, it is proposed that the band gap is continuously increased within the recovery period after the end of the network fault. The increase in the band gap after the end of the network fault can therefore be predefined in terms of time over this recovery period.

The band gap is preferably increased to a value up to the prefault gap after the end of the network fault. The band gap is therefore increased again after the end of the network fault to a value which it had before the network fault. This also has the purpose and advantage that the network fault can be passed through and then, at least after the expiry of the recovery period, the wind turbine feeds power into the electrical supply network again in a normal manner, namely in the normal operating mode.

At least the upper cut-off voltage preferably assumes a greater value before the network fault than during the network fault. In particular, the upper cut-off voltage is then increased again after the end of the network fault. The upper cut-off voltage can preferably be reduced by 3 to 10% from a value before the network fault to a value during the network fault.

According to one embodiment, it is proposed that, in order to feed in power in the normal mode, an intermediate circuit operating voltage is determined for the intermediate circuit voltage on the basis of an operating point of the wind turbine. In particular, the intermediate circuit voltage, and therefore the intermediate circuit operating voltage to be determined, is dependent in the normal mode on the level of the network voltage, an impedance of a network inductor and the current to be fed in, namely its phase angle and its amplitude. The current to be fed in, in particular the active current component to be fed in, depends in this case on the available wind power. A reactive current component can depend on a state of the electrical supply network and/or on specifications from a network operator.

It is now proposed that, when the network fault is detected, an intermediate circuit fault voltage is determined for the intermediate circuit voltage on the basis of the previously determined intermediate circuit operating voltage. The previously determined intermediate circuit operating voltage is that voltage which was determined last, that is to say immediately before the detected network fault, that is to say the last value of the intermediate circuit operating voltage. This is based, in particular, on the concept that, when the network fault occurs, there is neither sufficient time nor are there stable states to then independently determine an intermediate circuit fault voltage. Instead, the latter can be oriented to the last value of the intermediate circuit operating voltage.

It is proposed, in particular, that the intermediate circuit fault voltage is set to a predetermined intermediate circuit fault voltage if the previously determined intermediate circuit operating voltage is lower than the predetermined intermediate circuit fault voltage. In this case, the value is therefore increased, namely from the intermediate circuit operating voltage to the predetermined intermediate circuit fault voltage. Otherwise, the intermediate circuit fault voltage is set to the previously determined intermediate circuit operating voltage. In other words, during the transition from the normal mode to the mode in the event of a fault, the default value for the intermediate circuit voltage is not reduced, but rather is either increased if the intermediate circuit operating voltage was low or otherwise, if the intermediate circuit operating voltage was high, such a high value is retained. In this case, it was identified, in particular, that rather a high intermediate circuit voltage should be provided in the event of a network fault and also with regard to an end of the network fault in order to provide the inverter with a sufficient operating range for feeding in electrical power. Therefore, the intermediate circuit voltage should not be reduced if possible in the event of a fault. Nevertheless, the intermediate circuit fault voltage which is then selected should also be complied with and this is also achieved if possible by means of the chopper circuit and the proposed method.

In particular, it is proposed that the cut-off voltage or the upper cut-off voltage is set to the value of the intermediate circuit fault voltage if the network fault is detected. The intermediate circuit fault voltage and the cut-off voltage, at which the chopper circuit would discharge maximum power from the DC voltage intermediate circuit, therefore have an identical value. If appropriate, provision may be made for the intermediate circuit fault voltage to be set to be minimally lower than the cut-off voltage or the upper cut-off voltage. However, this is only an option and is not absolutely necessary.

The situation is therefore now achieved in which the intermediate circuit voltage is controlled to the value of the intermediate circuit fault voltage by means of the chopper circuit. This achieves the situation, in particular, in which this intermediate circuit voltage is held at a stable value, namely the value of the intermediate circuit fault voltage. The power fed in can therefore be controlled well.

It is preferably proposed that, after the end of the network fault, the intermediate circuit fault voltage is reduced, in particular is continuously reduced, and the cut-off voltage or the upper cut-off voltage is simultaneously increased, in particular is continuously increased. These are both preferably carried out within the recovery period. It is therefore possible to achieve the situation, in particular, in which the power fed in does not exceed a value which the power fed in had immediately before the network fault.

According to one embodiment, it is proposed that, after the end of the network fault, the power fed in is returned to a feed-in value in the normal mode, in particular is returned to the feed-in value in the normal mode via a monotonously increasing power profile. This makes it possible to avoid overshooting of this power fed in after the end of the network fault. This is achieved, in particular, by the described limitation of the intermediate circuit voltage. As a result, the wind turbine can contribute to the electrical supply network finding its way back from the network fault to a stable normal mode as safely and stably as possible.

According to a further embodiment, it is proposed that the limitation of the intermediate circuit voltage is additionally controlled on the basis of reactive power which is fed in. In this case, it comes into consideration, in particular, that this is carried out on the basis of a reactive power which was fed in immediately before the network fault. The limitation of the intermediate circuit voltage, which, for example in the case of reactive power which is fed in, may be higher than if no or less reactive power is fed in and the operating point is otherwise the same or similar, and can already be preparation for the feed-in mode immediately after the network fault. This is because, after the network fault, it may then likewise be necessary to feed in an accordingly high reactive power as before the network fault and the intermediate circuit voltage can then already be prepared for this.

Additionally or alternatively, it is proposed that the limitation of the intermediate circuit voltage is increased with a predeterminable temporal rise after the end of the network fault. In this case, it is proposed, in particular, to provide a corresponding gradient for the limitation of the intermediate circuit voltage. The renewed increase in this limitation, in particular the cut-off voltage or the upper cut-off voltage, can be associated with a drop in the intermediate circuit voltage or the intermediate circuit voltage remaining constant and it can be associated with an increase in the power which is fed in. In particular, the power can likewise be increased according to a predeterminable gradient and this can also be controlled by means of the described increase in the limitation of the intermediate circuit voltage; control of the power can at least be facilitated thereby.

It is preferably proposed that the limitation of the intermediate circuit voltage is increased only after a predeterminable waiting time after the end of the network fault. This is proposed, in particular, for a fault in which the network voltage has fallen to zero. In this case, this predeterminable waiting time, which may be in the range from 5 to 100 ms, in particular from 5 to 50 ms, can be used such that the network first of all actually returns, that is to say actually has a network voltage value which differs from zero, before power is then fed in and increased in order to finally restore a normal operating point of the electrical supply network. The invention also proposes a wind turbine. Such a wind turbine is distinguished, in particular, by the fact that it carries out a method characterized according to at least one embodiment described above or is prepared to carry out such a method. In particular, the wind turbine has, for this purpose, a control device (controller) which controls the at least one inverter of the wind turbine. For controlling such a method, the control device may be configured, in particular, by virtue of the fact that appropriate control modes are preprogrammed in an included process computer. Additionally or complementarily, appropriate control connections to the at least one inverter and optionally additionally to the at least one chopper circuit of the respective inverter are provided in order to thereby carry out the control method which the control device is prepared to carry out.

The proposed wind turbine may have one or more inverters. A plurality of inverters are usually provided in modern large wind turbines. They can also be referred to in their entirety as an inverter device. Each inverter may have its own DC voltage intermediate circuit or a common DC voltage intermediate circuit may be provided for one or more inverters. Accordingly, a chopper circuit can be provided for each individual DC voltage intermediate circuit or a common chopper circuit or a plurality of common chopper circuits can be provided for a common DC voltage intermediate circuit. The proposed solutions for controlling the feeding-in of power before, during and after a network fault can be implemented using all of the topologies mentioned, with the result that at least all of the topologies mentioned are preferred embodiments. In addition, the feeding-in of power can also be controlled, for example, by means of a common inverter or a common inverter device of a wind farm having a plurality of wind turbines. This is also a preferred embodiment.

The invention therefore also proposes a wind farm which has a plurality of wind turbines and is characterized in that it is prepared to carry out at least one method for feeding in electrical power according to at least one embodiment described above. In particular, the wind farm has a central farm control device which is prepared to carry out such a method. In particular, the farm control device is provided for this purpose with a process computer on which such a method is preprogrammed. The wind farm preferably has, for this purpose, at least one central inverter device which feeds the entire power from the wind farm into the electrical supply network at a network connection point. Such a common inverter device is preferably controlled by the central farm control device.

BRIEF DESCRIPTION OF THE SEVERAL VIEWS OF THE DRAWINGS

The invention is explained in more detail by way of example below on the basis of embodiments with reference to the accompanying figures.

DETAILED DESCRIPTION

Figure 1:
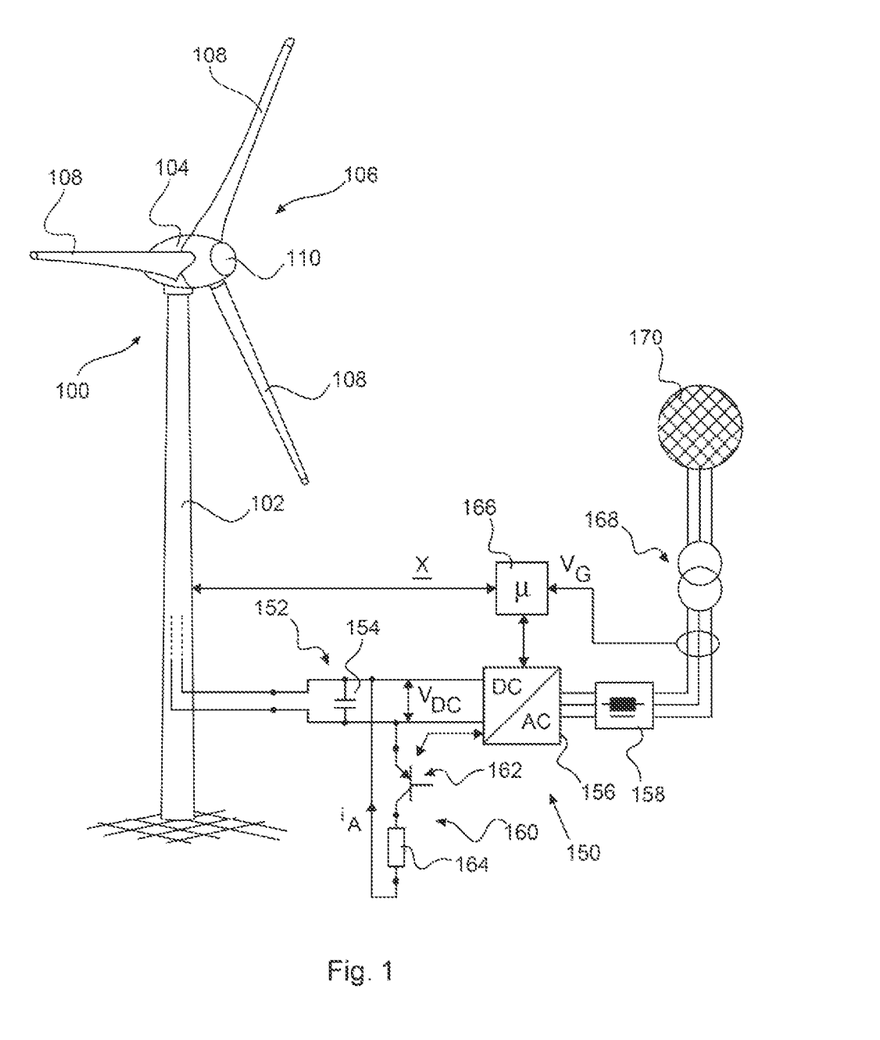
FIG. 1 shows a perspective illustration of a wind turbine.

FIG. 1 shows a wind turbine 100 having a tower 102 and a nacelle 104. A rotor 106 having three rotor blades 108 and a spinner 110 is arranged on the nacelle 104. During operation, the rotor 106 is caused to rotate by the wind and thereby drives a generator in the nacelle 104.

An inverter 150 is also schematically illustrated and has a DC voltage intermediate circuit 152 with a DC voltage intermediate circuit capacitor 154 and an inverter switching module 156 for generating a three-phase alternating current. An inductor module 158 can be connected downstream of the inverter switching module 156 and can likewise be considered to be part of the inverter 150.

A chopper circuit 160 is also provided and is connected to the DC voltage intermediate circuit 152 and substantially has a chopper switching module (switch) 162 and a chopper resistor 164. This chopper circuit 160 can also be considered to be part of the inverter 150.

In order to control the inverter 150, provision is made of a control device (controller) 166 which controls, in particular, the inverter switching module 156, which is indicated by a double-headed arrow to the inverter switching module 156. The control device 166 likewise controls the chopper circuit 160, namely the chopper switching module 162, in particular. This can be carried out indirectly via the inverter switching module 156, which is indicated by a corresponding double-headed arrow between the inverter switching module 156 and the chopper switching module 162. In particular, the control of the chopper circuit 160 or of the chopper switching module 162 can depend on a captured intermediate circuit voltage $V_{DC}$ which is in turn captured by the inverter switching module 156 or is also used there. Alternatively, the control device 166 can directly control the chopper switching module 162.

The chopper switching module 162 now operates such that it discharges power from the DC voltage intermediate circuit 152 via a pulse pattern. In this case, a pulsed leakage current is produced and results in heating in the chopper resistor 164, as a result of which energy is discharged there from the DC voltage intermediate circuit as heat.

This control of the chopper circuit 160 and therefore of the chopper switching module 162 can be carried out on the basis of a network voltage $V_G$, an operating point of the wind turbine 100 and/or instantaneous settings of the inverter 150, in particular of the inverter switching module 156. The control device 166 accordingly processes information required for this. For this purpose, the network voltage $V_G$ can be captured on a primary side of a network transformer 168, via which power is fed into the electrical supply network 170. With the connection shown, the network voltage $V_G$ would still have to be converted, but could alternatively also be captured on a secondary side of the network transformer 168.

A voltage dip in the electrical supply network 170 can be detected, and a network fault can therefore be detected, by capturing the network voltage $V_G$. The control device 166 can operate on the basis of this and can then also control the chopper circuit 160 if necessary.

In order to capture an operating point of the wind turbine 100, appropriate information can be obtained from the wind turbine, which is intended to be indicated using the state vector x. This information may include, for example, the speed, blade angle and a set excitation power of the generator of the wind turbine, to name just a few examples. The inverter 150 itself should naturally also be actually understood to be part of the wind turbine 100 and its information, for example the respective currently emitted active power and currently emitted reactive power, can therefore also be taken into account. This is indicated by an appropriate double-headed arrow between the control device 166 and the inverter switching module 156.

Figure 2:
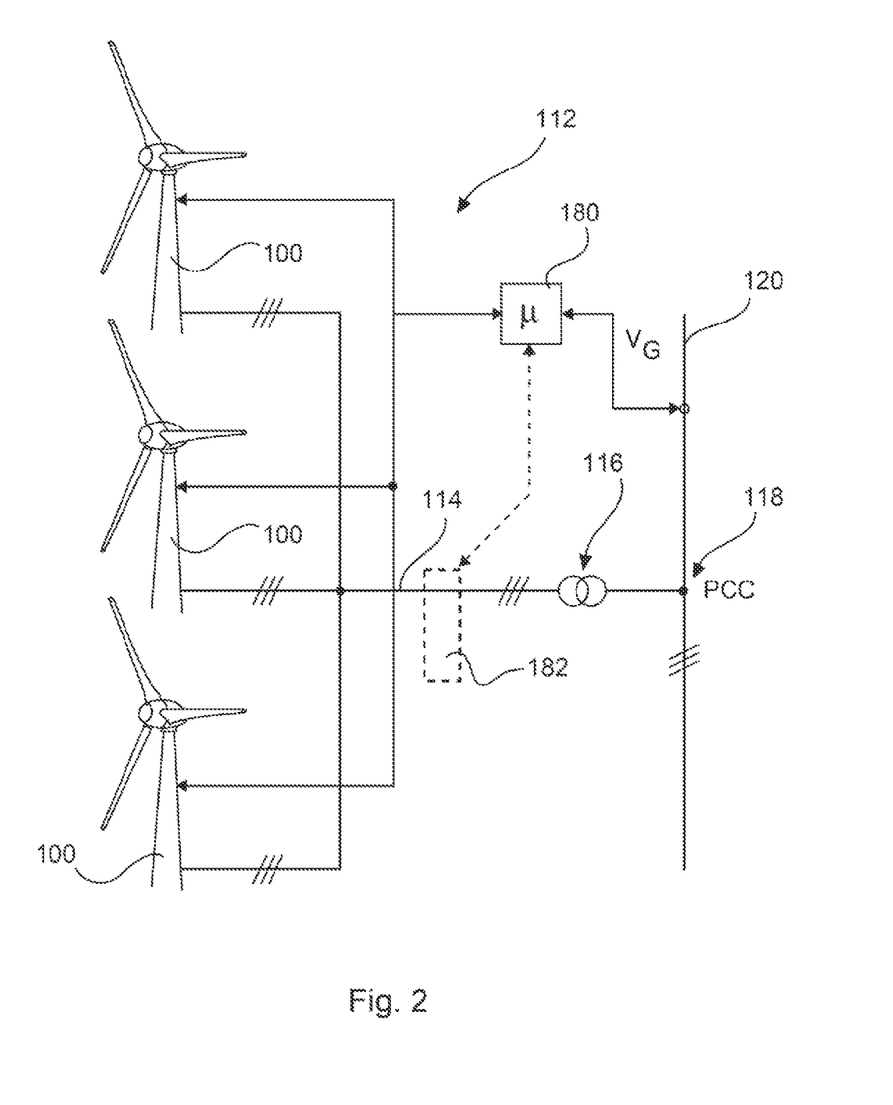
FIG. 2 shows a schematic illustration of a wind farm.

FIG. 2 shows a wind farm 112 having, by way of example, three wind turbines 100 which may be identical or different. The three wind turbines 100 are therefore representative of fundamentally any desired number of wind turbines in a wind farm 112. The wind turbines 100 provide their power, namely in particular the generated current, via an electrical farm network 114. In this case, the currents or powers respectively generated by the individual wind turbines 100 are added and a transformer 116 is usually provided and steps up the voltage in the farm in order to then feed it into the supply network 120 at the feed-in point 118 which is also generally referred to as the PCC. FIG. 2 is only a simplified illustration of a wind farm 112 in which the farm network 114, for example, may be configured differently in that a transformer is also present at the output of each wind turbine 100, for example, to name just one other exemplary embodiment.

In order to control the wind farm, it is possible to provide a central farm control device (central farm controller) 180 which can control the individual wind turbines 100 and can also obtain information from these wind turbines.

According to one embodiment, the central farm control device 180 can also capture a network voltage $V_G$ of the electrical supply network 120. The electrical supply network 120 can correspond to the electrical supply network 170 in FIG. 1. The central farm control device 180 can alternatively or additionally also receive the network voltage $V_G$ from at least one of the wind turbines 100.

In order to illustrate an embodiment, a common inverter device (inverter) 182 is provided in FIG. 2 and can operate as a central inverter for the wind farm 112. This common inverter device 182 is illustrated using dashed lines in order to illustrate that this is an option. If this option is selected, provision may be made, contrary to the illustration in FIG. 2, for electrical power not to be supplied to the common inverter device 182 by the individual wind turbines 100 as three-phase alternating current, but rather by a DC voltage network or DC network. The common inverter device 182 can then invert this power received overall in this manner.

This common inverter device 182 can likewise also be controlled by the central farm control device 180 and can also transmit information to this central farm control device 180, which is indicated by a double-headed arrow illustrated using dashed lines.

Proposed limitation of an intermediate circuit voltage can be carried out in this common inverter device 182, with the result that a corresponding chopper circuit is also provided there. Alternatively, when using this common inverter device or another common inverter device 182, it may also be provided that, although the inversion is carried out in the common inverter device 182, one or more chopper circuits are controlled in the individual wind turbines. This can be coordinated by the central farm control device 180.

Figure 3:
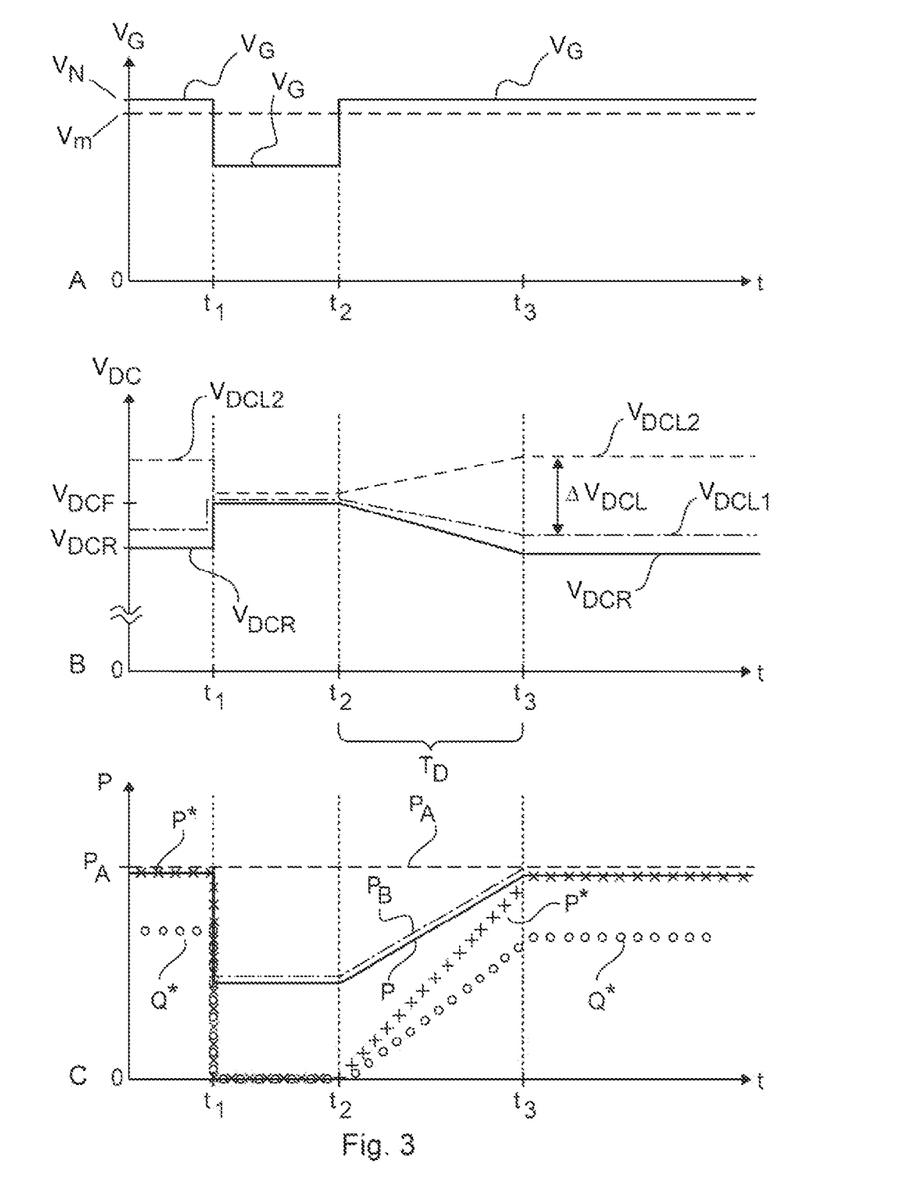
FIG. 3 shows graphs of voltage and power profiles for illustrating a proposed method.

FIG. 3 shows three individual graphs A, B and C which are based on the same time axis. The intention is therefore to illustrate and explain what relationship exists between the functions illustrated in the graphs.

The uppermost graph A shows a profile of a network voltage $V_G$. This network voltage $V_G$ ideally has the value of the nominal network voltage $V_N$. The profile of this network voltage $V_G$ is schematically illustrated by way of example for a fault, wherein the solid line represents an actual, captured profile of the network voltage $V_G$. For the sake of simplicity, measurement inaccuracies, including measurement delays, are not illustrated in the illustrations in FIG. 3 and are therefore not discussed.

In graph A, an undervoltage value $V_m$ which should not be undershot by the network voltage $V_G$ is also indicated by means of a horizontal dashed line. If the network voltage nevertheless undershoots this value, a network fault is assumed on the basis of a detected voltage dip.

Such a network fault, in which the network voltage $V_G$ falls below the undervoltage value $V_m$, occurs at the time $t_1$ and therefore indicates the start of a network fault. At the time $t_2$, the network voltage $V_G$ increases above the undervoltage value $V_m$ again and this indicates the end of the network fault.

It is repeated that these graphs in FIG. 3 are of a schematic nature and, in particular, the network voltage can also fluctuate, for example, in the range between $t_1$ and $t_2$, in particular. The time $t_2$ indicates the end of the network fault because the network voltage $V_G$ exceeds the undervoltage value $V_m$ again. Nevertheless, the electrical supply network may then still be very unstable and there may also be after-effects of the network fault, for example loads disconnected from the network or feeders disconnected from the network or even loads and feeders which still have to be started up again, to name just a few examples. In principle, however, it is assumed that the electrical supply network has stabilized well again at the time $t_3$.

In this respect, graph A also shows only one example of a possible network fault of a voltage dip, in which the network voltage $V_G$ falls to a lower value. However, it also comes into consideration that the network voltage falls to a very low value or even to zero. This naturally also affects the possible power which is fed in, and in this respect, the illustration in graph C which is also explained below and has the profiles shown there according to solid and dot-dashed lines also relates to the voltage dip shown according to graph A, in which the voltage does not fall to zero.

So that the wind turbine or possibly the wind farm can also contribute to stabilizing the network, a profile of the power fed in, such as according to graph C, is provided. In this case, the profile of the power P is also oriented to the three times $t_1$ to $t_3$. An alternative profile is depicted as a line of x symbols.

For the purpose of illustration, it is assumed that the power which can be produced from the wind substantially remains constant for the duration of the illustration of the graphs in FIG. 3 and any fluctuations in the illustration can be disregarded. Maximum powers shown can therefore also be held.

In any case, graph C shows the power P delivered to the electrical supply network by the wind turbine or, according to another embodiment, by the wind farm. This power has the initial power $P_A$ at the beginning of the illustration. This initial power $P_A$ is then depicted as a dashed horizontal line for orientation.

The power P which is actually fed in therefore has the value $P_A$. The slight deviation, shown at the start of the graph, between the horizontal dashed line for $P_A$ and the solid line for P is used only for better clarity. These two powers should actually be identical, if technically feasible, which also applies to the region after the third time $t_3$.

At the time $t_1$, that is to say at the start of a network fault, the power is reduced to the value of a limit power $P_B$. This limit power $P_B$ is depicted as a dot-dashed line and initially runs horizontally between the times $t_1$ and $t_2$, namely for the duration of the network fault. After the end of the network fault at the time $t_2$, this profile of the limit power $P_B$ increases, over a predefined edge, to the value of the initial power $P_A$ at the time $t_3$. The dot-dashed line of the limit power $P_B$ is also illustrated above the solid line of the power P only for reasons of illustration. These two profiles should ideally coincide.

In any case, the power P fed in before the network fault has the value of the initial power $P_A$, is then controlled down, at the start of the fault at the time $t_1$, by the specification of the limit power $P_B$, to precisely this value of the limit power $P_B$ at that time and is held at this low value until the end of the network fault at the time $t_2$. The delivered power P is then slowly controlled back to the value of the initial power before the network fault by means of the rising profile of the limit power $P_B$.

In principle, there is the risk that, in the case of these power changes, in particular also at the end of the network fault at the time $t_2$, the power P fed in can tend to overshoot. This can be facilitated, in particular, by the sudden voltage rise of the network voltage $U_G$ at the time $t_2$, that is to say at the end of the network fault, on account of the dynamic response of the system. Even though there are situations in which such overshooting of the power after the end of the network fault above a value of the initial power $P_A$ is proposed, this may be undesirable in some situations and it is therefore proposed here to also feed in the power P fed in, and in particular at the end of the network fault and afterward, without overshooting. In order to achieve this, particular control of the intermediate circuit voltage is proposed, which is intended to be illustrated by graph B.

Graph B therefore shows the profile of an intermediate circuit voltage $V_{DC}$ of a DC voltage intermediate circuit of an inverter of a wind turbine or of a wind farm. The DC voltage intermediate circuit may also be coupled to a plurality of inverters. In graph B, the solid line shows the corresponding voltage profile as the intermediate circuit voltage $V_{DCR}$ which is predefined or required in terms of control. For simplification, it is assumed here that the intermediate circuit voltage $V_{DC}$ is actually set in the manner required by the predefined intermediate circuit voltage $V_{DCR}$.

It is also pointed out that it is indicated, on the ordinate of graph B, that said ordinate is interrupted, that is to say would be considerably longer in an actual representation. In other words, the voltage variations shown in graph B are comparatively low in comparison with the total amplitude of the intermediate circuit voltage.

At the start of the illustration, that is to say when the network fault has not yet occurred, an intermediate circuit voltage $V_{DCR}$ is predefined on the basis of the operating point of the wind turbine. This may mean, in particular, here that this is effected on the basis of the network voltage, the impedance of a network inductor, such as the network inductor 158 in FIG. 1, and on the basis of the phase angle and the amplitude of the current to be fed in. The intermediate circuit voltage $V_{DC}$ can then be controlled, in particular, by means of an upstream boost converter or alternatively by means of an active rectifier, which are both between a generator and the DC voltage intermediate circuit. In addition, it can also be controlled by the feeding-in of power, that is to say by an inverter switching module, such as the inverter switching module 156 in FIG. 1. In addition, it can be controlled by the chopper circuit, for example by the chopper circuit 160 in FIG. 1. Ideally, or in particular in a so-called network parallel mode, it is proposed, however, that the chopper circuit controls the intermediate circuit voltage only in exceptional cases since, if the chopper circuit responds, power is consumed, namely is otherwise converted into heat without being used. However, there may be situations in which the chopper circuit intervenes in a controlling manner, and such a case is proposed for the network fault illustrated in FIG. 3.

In order to control the chopper circuit, a lower cut-off voltage $V_{DCL1}$ and an upper cut-off voltage $V_{DCL2}$ are predefined. In graph B, the lower cut-off voltage $V_{DCL1}$ is depicted as a dot-dashed line and the upper cut-off voltage $V_{DCL2}$ is depicted as a simply dashed line. They have a changeable band gap $\Delta V_{DCL}$ with respect to one another. This band gap is comparatively large before the network fault and has the following technical purpose.

If the intermediate circuit voltage $V_{DC}$ reaches the lower cut-off voltage $V_{DCL1}$, the chopper circuit begins to discharge less power from the DC voltage intermediate circuit. The switching pattern is then such that a chopper switch, which is in the form of a semiconductor switch, is closed for a comparatively short time and is open for a comparatively long time. There are therefore brief current spikes in order to discharge accordingly little power. However, the higher the intermediate circuit voltage $V_{DC}$ rises, that is to say the closer it comes to the upper cut-off voltage $V_{DCL2}$, the more power is discharged from the DC voltage intermediate circuit by the chopper circuit. The current pulses then therefore become broader and broader and the pauses between the current pulses become narrower and narrower. If the intermediate circuit voltage reaches the upper cut-off voltage, the chopper circuit is controlled such that it discharges maximum power from the DC voltage intermediate circuit.

For the illustrated region before the network fault, it should be the case if possible that the intermediate circuit voltage does not reach the lower cut-off voltage $V_{DCL1}$ at all or at least does not exceed it. If possible, the intermediate circuit voltage should be controlled in this region only by means of the inverter switching module, that is to say by means of the power which is fed in, and by means of said boost converter or active rectifier. If the intermediate circuit voltage nevertheless exceeds the lower cut-off voltage $V_{DCL1}$, the chopper circuit can additionally counteract such an excessively high voltage value. If the intermediate circuit voltage nevertheless increases further, the chopper circuit can accordingly counteract this to a greater and greater extent with an increasing intermediate circuit voltage.

If the network fault now occurs at the time $t_1$, this band gap $\Delta V_{DCL}$ is immediately reduced, ideally to a very low value or even to the value close to zero. When the intermediate circuit voltage $V_{DC}$ exceeds the lower cut-off voltage $V_{DCL1}$, this results in it also reaching or exceeding the upper cut-off voltage $V_{DCL2}$. This results in the chopper circuit then almost immediately discharging maximum power from the DC voltage intermediate circuit. Precisely this is also desired and, in this fault, it is then no longer important to feed as much power as possible in the network parallel mode into the electrical supply network, but rather to contribute particularly well to stabilizing the network. It has been identified that this can be achieved by means of the proposed control of the chopper circuit. The power P which is fed in can be better controlled as a result.

It should be noted, in particular, that the active power P which is fed in can also be controlled to a lower value by this reduction in the band gap $\Delta V_{DCL}$, as is shown in graph C at the time of the network fault between the times $t_1$ and $t_2$. It should be noted in this case that it is not necessarily important to also reduce the intermediate circuit voltage for the power reduction shown. Rather, it has been identified that a particularly stable intermediate circuit voltage, despite greatly varying further circumstances such as the rapid change in the network voltage $V_G$, can also facilitate the stabilization of a low power which is fed in. In this case, a comparatively high intermediate circuit voltage can make it possible to better control the feeding-in of the power.

Therefore, in the variant shown in FIG. 3, the predefined intermediate circuit voltage $V_{DCR}$ is also increased to a higher value at the time $t_1$, that is to say at the start of the network fault, namely to the value of an intermediate circuit fault voltage $V_{DCF}$. This is proposed, in particular, when the previously predefined intermediate circuit voltage $V_{DCR}$ has assumed rather a lower value on account of the settings dependent on the operating point. This lower value may be, for example, 550 V or 630 V which is then increased to a value of 680 V as an intermediate circuit fault voltage in the event of a network fault. If, however, the value of the predefined intermediate circuit voltage was comparatively high on account of the operating point before the fault, for example if it was 700 V, such a high value is retained and is not lowered to the value of the intermediate circuit fault voltage $V_{DCF}$ of 680 V mentioned by way of example. The predefined value for the intermediate circuit voltage is therefore either increased at the start of the network fault if it was previously comparatively low or its level is retained.

This is based on the consideration that it is scarcely possible to adequately determine an ideal value for an intermediate circuit voltage in the event of a network fault, that is to say if the network fault is currently present. A practical value must therefore be set immediately at the start of the network fault. In this respect, it has been identified, on the one hand, that the value of the predefined intermediate circuit voltage $V_{DCR}$ determined before the network fault can provide orientation and the value of the intermediate circuit voltage should also not be too low in the event of a fault to forfeit no control reserves if possible when feeding in power in the event of a fault.

If the network fault has now ended, at least insofar as the network voltage $V_G$ has exceeded the predefined undervoltage value $V_m$ again, the normal mode should now be established again in a stable manner. For this purpose, the control of the intermediate circuit voltage $V_{DC}$ provides for the band gap $\Delta V_{DCL}$ to be slowly increased after the end of the network fault, that is to say after the time $t_2$. For this purpose, an edge of the lower voltage limit $V_{DCL1}$ may gradually fall until the time $t_3$, while the upper voltage limit $V_{DCL2}$ likewise and simultaneously gradually increases until the time $t_3$. This is associated with the predefined intermediate circuit voltage $V_{DCR}$ also gradually falling back to its old value before the network fault from the end of the network fault to the time $t_3$. It is then assumed, that is to say at the time $t_3$, that the electrical supply network has substantially recovered from the network fault. Therefore, the period between the end of the network fault at the time $t_2$ and the later time $t_3$ is referred to as the recovery period $T_D$. It is then assumed, already in the recovery period $T_D$, at the latest after the time $t_3$, that the chopper circuit is scarcely still operating and at best discharges little power from the intermediate circuit, ideally no longer discharges any power from the intermediate circuit. As shown by graph C, the power P fed in then also reaches its initial value $P_A$ again.

In graph B, the upper cut-off voltage $V_{DCL2}$, the lower cut-off voltage $V_{DCL1}$ and the predefined intermediate circuit voltage $V_{DCR}$ are close to one another during the network fault, that is to say between the times $t_1$ and $t_2$. If $V_{DCL1}$ and $V_{DCL2}$ coincide, 100% chopping is carried out as soon as the voltage $V_{DCL1}$ is reached or exceeded. Ideally, a small gap between $V_{DCL1}$ and $V_{DCL2}$ is proposed. The gaps between the three lines shown in graph B between the times $t_1$ and $t_2$ are very small and are selected owing to the illustration in such a manner that this gap can also be discerned in order to also be able to distinguish the three lines there.

In the region before the network fault, that is to say before the time $t_1$, and after the network fault, that is to say after the time $t_2$, the upper cut-off voltage $V_{DCL2}$ and the lower cut-off voltage $V_{DCL1}$ differ more considerably, however. A slight difference between the lower cut-off voltage $V_{DCL1}$ and the predefined cut-off voltage $V_{DCR}$ is likewise shown in these regions. According to one embodiment, these two profiles can coincide, however, and the predefined cut-off voltage $V_{DCR}$ can be optionally predefined for this case using the lower cut-off voltage $V_{DCL1}$. Preferably, $V_{DCL1}$ is somewhat higher than $V_{DCR}$.

Graph C in FIG. 3 illustrates, as a further alternative, a power profile with P* which falls to zero at the beginning of the network fault, but is likewise controlled back to the value of the initial power again at the end of the network fault at the time $t_2$. This profile is indicated using x symbols. For this variant, the profile of a reactive power Q* is likewise illustrated. The reactive power also falls to zero here at the beginning of the network fault $t_1$ but then increases again to the old reactive power value by the time $t_3$ after the end of the network fault at the time $t_2$. This variant can also be implemented using intermediate circuit control, as illustrated in graph B.

Figure 4:
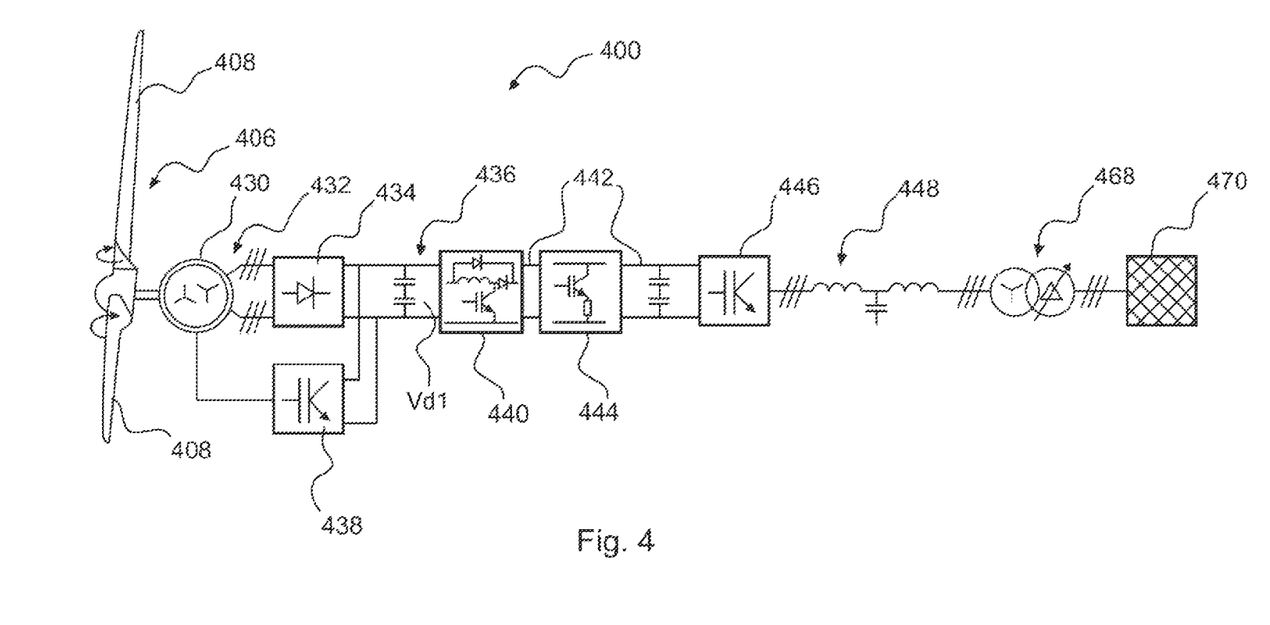
FIG. 4 shows a schematic illustration of some elements of a wind turbine.

FIG. 4 shows, for a wind turbine 400, a rotor 406 having rotor blades 408 whose blade angle can be adjusted. The rotor 406 is coupled to a generator 430 which here is in the form of a six-phase synchronous generator with separate excitation. The generator 430 therefore generates a six-phase stator current at its generator output 432, which stator current is rectified by means of a rectifier 434 and is passed to a lower DC voltage intermediate circuit 436. An excitation adjuster 438 can also be supplied by this lower DC voltage intermediate circuit 436 in order to provide an excitation current for the separately excited synchronous generator 430.

A boost converter 440 is connected to the lower DC voltage intermediate circuit 436 and increases the voltage of the lower DC voltage intermediate circuit 436 to a higher voltage in a connected upper DC voltage intermediate circuit 442. The upper DC voltage intermediate circuit 442 in FIG. 4 can correspond to the DC voltage intermediate circuit 152 in FIG. 1. The lower DC voltage intermediate circuit 436 may be arranged, for example, in the nacelle 104 of the wind turbine 100 in FIG. 1.

The upper DC voltage intermediate circuit 442 likewise has a chopper circuit 444 which may be constructed like the chopper circuit 160 in FIG. 1. For inversion, provision is made of an inverter switching module 446 which outputs a three-phase alternating current or a three-phase AC voltage and guides it via a network filter 448 which comprises a corresponding network inductor. Finally, provision is made of a network transformer 468 which can correspond to the network transformer 168 in FIG. 1 and can comprise an adjusting apparatus, that is to say can be in the form of an adjustable transformer. The result is then fed into the electrical supply network 470 which can correspond to the electrical supply network 170 in FIG. 1 or 120 in FIG. 2.

Wind turbines having a modular full converter concept preferably feed the power produced from the wind into the energy system, that is to say into an electrical supply network. In this case, a rectifier intermediate circuit voltage $V_{D1}$ which is dependent on the operating point is established. This can therefore be applied to the lower DC voltage intermediate circuit 436 in FIG. 4.

The intermediate circuit voltage $V_{D2}$ required for the feed-in mode, if it is required, is increased to the necessary level via a boost converter module. This can be carried out, for example, by the boost converter 440 according to FIG. 4. There is a need to increase the voltage by means of this boost converter 440, in particular, when comparatively little power can be drawn from the wind, that is to say when the wind turbine, and therefore the generator, does not operate at full load.

The necessary intermediate circuit voltage $V_{D2}$, which corresponds to the intermediate circuit voltage $V_{DC}$ according to FIG. 1, is dependent, in particular, on the network voltage $V_G$, the impedance of the network inductor, that is to say also the impedance of the filter 448 in FIG. 4 in particular, and both the phase angle and the amplitude of the current to be fed in. The network inductor of the filter 448 is particularly relevant and the capacitance can be ignored, with the result that only the network inductor 158 is shown in FIG. 1.

This necessary intermediate circuit voltage is calculated online on the basis of desired values for each operating point and is accordingly updated. The operating point can therefore be captured, but it is proposed here to use the desired values for the operating point.

In the event of a network fault, any excess energy from the DC voltage intermediate circuit is converted into heat in the chopper resistor. A current which is dependent on the feed-in strategy and the parameterization is established at the output of the inverter. This current at the output of the inverter therefore does not need to feed in all power, but rather only that power which is also intended to be fed in on account of the selected or predefined concept. The remainder is discharged from the intermediate circuit by means of the chopper circuit and is converted into heat in the chopper resistor which may naturally also be implemented as a resistor bank.

In this case, it is proposed, in particular, to return to the optimum operating point after the end of a network fault without overshooting being visible at the output of the inverter, namely without the power which is fed in overshooting.

The proposed invention is provided, in particular, for connection to soft networks which would otherwise react to a power overshoot at the output of the inverter with overvoltage. Such an overshoot of the power, and therefore overshooting of the voltage of the soft network, that is to say of the electrical supply network into which power is being fed, is avoided.

The invention claimed is:

1. A method for feeding electrical power into an electrical supply network using at least one wind turbine, comprising:
   in response to determining that a network fault of the electrical supply network is not detected, feeding the electrical power into the electrical supply network using an inverter of the at least one wind turbine in a normal mode, wherein:
      the electrical supply network has a network voltage, and
      the inverter has a direct current (DC) voltage intermediate circuit having an intermediate circuit voltage and a chopper circuit coupled to the DC voltage intermediate circuit and configured to discharge electrical energy from the DC voltage intermediate circuit;
   detecting the network fault in response to the network voltage being less than an undervoltage value associated with a nominal network voltage;
   in response to detecting the network fault, interrupting the feeding of the electrical power into the electrical supply network or reducing the feeding of the electrical power into the electrical supply network;
   in response to detecting an end of the network fault, terminating the interruption of the feeding of the electrical power or terminating the reduction of the feeding of the electrical power;
   limiting the fed-in electrical power to a power limit during the network fault and/or after the end of the network fault; and
   limiting the intermediate circuit voltage based on the power limit using the chopper circuit in order to limit the fed-in electrical power to the limit power during the network fault and/or after the end of the network fault.

2. The method as claimed in claim 1, comprising:
   limiting the fed-in electrical power to the power limit after the end of the network fault for a recovery period that is between 10 millisecond (ms) and 10 seconds, wherein the fed-in electrical power in the recovery period is the same as or lower than immediately before detecting the network fault.

3. The method as claimed in claim 1, wherein the power limit is predefined as a time-dependent power profile in order to return the fed-in electrical power after the end of the network fault to a value of the fed-in electrical power immediately before the network fault.

4. The method as claimed in claim 1, wherein
   setting at least one cut-off voltage based on the network fault and/or the power limit, wherein the at least one cut-off voltage is used to limit the intermediate circuit voltage during the network fault and/or after the end of the network fault; and
   discharging, by the chopper circuit, the electrical energy from the DC voltage intermediate circuit depending on whether the intermediate circuit voltage reaches or exceeds the cut-off voltage.

5. The method as claimed in claim 1, comprising:
   setting a lower cut-off voltage and an upper cut-off voltage based on the network fault and/or the power limit to limit the intermediate circuit voltage, wherein the upper cut-off voltage is greater than the lower cut-off voltage by a band gap that is variable;
   discharging electrical energy from the DC voltage intermediate circuit using the chopper circuit in response to the intermediate circuit voltage reaching the lower cut-off voltage; or
   discharging additional electrical energy from the DC voltage intermediate circuit using the chopper circuit inversely proportionally to a difference between the intermediate circuit voltage and the upper cut-off voltage.

6. The method as claimed in claim 1, comprising:
   determining an intermediate circuit operating voltage for the intermediate circuit voltage based on an operating point of the wind turbine to feed in the electrical power in the normal mode;
   in response to detecting the network fault, determining an intermediate circuit fault voltage for the intermediate circuit voltage based on the determined intermediate circuit operating voltage;
   in response to detecting the network fault, setting a cut-off voltage or an upper cut-off voltage to the intermediate circuit fault voltage to control the intermediate circuit voltage to the intermediate circuit fault voltage using the chopper circuit; or
   after the end of the network fault, increasing the intermediate circuit fault voltage, the cut-off voltage or the upper cut-off voltage.

7. The method as claimed in claim 1, comprising:
   after the end of the network fault, returning the fed-in electrical power to a feed-in value of the normal mode.

8. The method as claimed in claim 1, comprising:
   limiting the intermediate circuit voltage based on a fed-in reactive power;
   increasing the limiting of the intermediate circuit voltage with a predeterminable temporal rise after the end of the network fault; or
   increasing the limiting of the intermediate circuit voltage only after a predeterminable waiting time after the end of the network fault.

9. A wind turbine for feeding electrical power into an electrical supply network having a network voltage, the wind turbine comprising:
   at least one inverter configured to feed the electrical power, wherein the at least one inverter has:

a DC voltage intermediate circuit having an intermediate circuit voltage, and a chopper circuit coupled to the DC voltage intermediate circuit and configured to discharge electrical energy from the DC voltage intermediate circuit; and a controller configured to:

control the at least one inverter, control the feeding of the electrical power into the electrical supply network using the at least one inverter in a normal mode in response to determining that the network fault of the electrical supply network is not detected, detect a network fault in response to the network voltage being less than an undervoltage value associated with nominal network voltage, in response to detecting the network fault, interrupt the feeding of the electrical power or reduce feeding of the electrical power, in response to detecting an end of the network fault, terminate interrupting the feeding of the electrical power or terminate reducing the feeding of the electrical power, limiting the fed-in electrical power a power limit during the network fault and/or after the end of the network fault, and limiting the intermediate circuit voltage based on the power limit using the chopper circuit in order to limit the fed-in electrical power to the limit power during the network fault and/or after the end of the network fault.

10. A wind farm, comprising:

a plurality of wind turbines including the wind turbine as claimed in claim 9;

a central farm controller; and a common inverter.

11. The method as claimed in claim 1, the undervoltage value is less than 90% of the nominal network voltage.

12. The method as claimed in claim 11, the undervoltage value is less than 80% of the nominal network voltage.

13. The method as claimed in claim 2, wherein the recovery period that is between 50 ms and 2 seconds.

14. The method as claimed in claim 3, wherein the time-dependent power profile has a rising edge.

15. The method as claimed in claim 5, wherein the band gap has a prefault gap before the network fault, if the network fault is detected, the band gap is reduced in order to discharge as much electrical energy as possible from the DC voltage intermediate circuit using of the chopper circuit in response to the intermediate circuit voltage reaching the lower cut-off voltage, or the band gap is increased after the end of the network fault in order to reduce electrical energy discharged from the DC voltage intermediate circuit.

16. The method as claimed in claim 15, comprising:

continuously increasing the band gap;

continuously increasing the band gap within a recovery period; or increasing the band gap to the prefault gap.

17. The method as claimed in claim 6, wherein determining the intermediate circuit fault voltage is determined by at least:

setting the intermediate circuit fault voltage to a predetermined intermediate circuit fault voltage if the intermediate circuit operating voltage is lower than the predetermined intermediate circuit fault voltage; and setting the intermediate circuit fault voltage to the intermediate circuit operating voltage if the intermediate circuit operating voltage is greater than the predetermined intermediate circuit fault voltage.

18. The method as claimed in claim 6, comprising:

after the end of the network fault, continuously increasing the intermediate circuit fault voltage, the cut-off voltage or the upper cut-off voltage.

19. The method as claimed in claim 7, wherein returning the fed-in electrical power to the feed-in value of the normal mode is performed via a monotonously increasing power profile.

* * * * *